(12) United States Patent
Bolgar et al.

(10) Patent No.: US 8,052,373 B2
(45) Date of Patent: Nov. 8, 2011

(54) MULTI-ROTATIONAL CRANKSHAFT ARRANGEMENT

(75) Inventors: Crispin D. Bolgar, Nottingham (GB); Michael J. Sheath, Nottingham (GB)

(73) Assignee: Rolls-Royce PLC, London (GB)

( * ) Notice: Subject to any disclaimer, the term of this patent is extended or adjusted under 35 U.S.C. 154(b) by 414 days.

(21) Appl. No.: 12/453,775

(22) Filed: May 21, 2009

(65) Prior Publication Data
US 2009/0318238 A1 Dec. 24, 2009

(30) Foreign Application Priority Data
Jun. 20, 2008 (GB) .................................. 0811286.4

(51) Int. Cl.
*F01D 19/00* (2006.01)
*F01D 17/06* (2006.01)
*F01D 21/02* (2006.01)
*F03D 7/00* (2006.01)
*F01B 25/06* (2006.01)
*F03B 15/06* (2006.01)
*F04D 15/00* (2006.01)
*F04D 27/00* (2006.01)

(52) U.S. Cl. .............. 415/30; 415/75; 415/90; 416/20 R

(58) Field of Classification Search .................... 415/30, 415/71, 75, 90, 107, 144, 229; 416/19, 20 R, 416/148
See application file for complete search history.

(56) References Cited

U.S. PATENT DOCUMENTS

| | | | | |
|---|---|---|---|---|
| 3,759,629 A * | 9/1973 | Abramopaulos | ........... | 416/20 R |
| 4,629,395 A * | 12/1986 | Mohsin | ........................... | 415/75 |
| 4,662,177 A * | 5/1987 | David | ............................ | 60/595 |
| 4,747,796 A * | 5/1988 | Iwai et al. | ...................... | 440/83 |
| 4,820,480 A * | 4/1989 | David | ........................... | 418/153 |
| 5,110,483 A * | 5/1992 | Boersma | ....................... | 210/787 |
| 6,109,790 A * | 8/2000 | von Gynz-Rekowski et al. | ............................. | 384/97 |
| 6,483,022 B1 * | 11/2002 | Packard | ....................... | 174/15.1 |
| 6,615,586 B1 * | 9/2003 | Boric | ............................. | 60/729 |
| 7,160,082 B2 * | 1/2007 | Allen et al. | ................... | 415/229 |
| 7,661,399 B2 * | 2/2010 | Gregor et al. | .............. | 123/90.17 |
| 7,827,945 B2 * | 11/2010 | Gregor et al. | .............. | 123/90.15 |

FOREIGN PATENT DOCUMENTS

| | | |
|---|---|---|
| DE | 201 14 367 U 1 | 2/2003 |
| EP | 1 101 902 A3 | 5/2001 |
| GB | 1060534 | 3/1967 |
| SU | 1525358 A1 | 11/1989 |

* cited by examiner

*Primary Examiner* — Chris Chu
(74) *Attorney, Agent, or Firm* — Oliff & Berridge, PLC

(57) ABSTRACT

A control mechanism for moving at least two components of a gas turbine engine, the control mechanism comprises first and second crankshafts and a torsion bar connected to both crankshafts, each crankshaft is connected to a different component, the crankshafts engage one another via one-way abutment means and the torsion bar is pre-twisted so that up to a predetermined rotational extent the two crankshafts rotate together and beyond that extent only the first crankshaft rotates, thereby one of the two components moves more than the other component.

14 Claims, 4 Drawing Sheets

MULTI-ROTATIONAL CRANKSHAFT ARRANGEMENT

Figure 1:
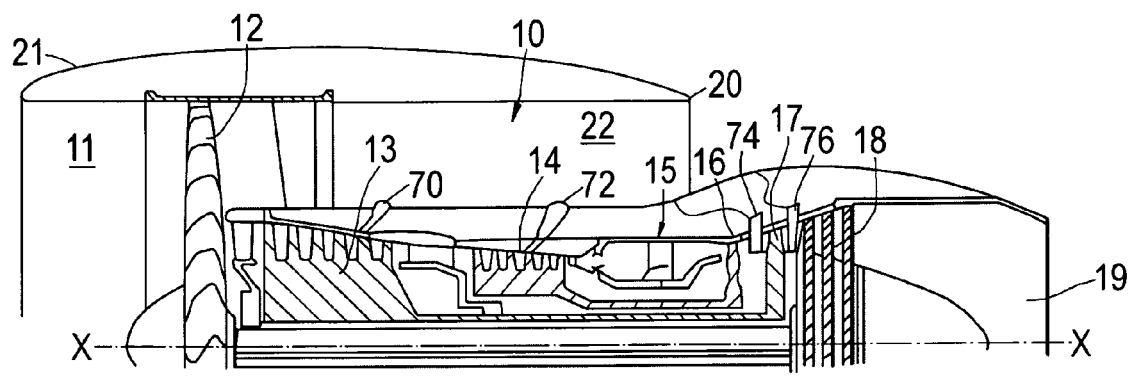

The present invention relates to a mechanism for controlling the position of multiple variable components and in particular but not exclusively stator vanes of a gas turbine engine.

Crankshaft type devices are commonly used to provide rotational control of annular arrays of vanes in multiple stages in a compressor of a gas turbine engine. These typically consist of a tube, mounted on bearings, having devises for mounting an actuator rod and con rods which are used to drive unison rings connecting each variable vane of a stage. Existing crankshaft designs provide linked behaviour between the different stages of vane, such that the vanes of each stage rotate a relative amount to those of the other linked stages.

It is has been found to be desirable to change the flow capacity of the compressor by additional opening of an upstream or inlet guide vane once the other stages of vanes have reached their maximum required opening position. It is not possible to achieve this additional variable inlet guide vane movement with a traditional crankshaft arrangement due to the fixed relationship between the variable inlet guide vane and variable vane crankshaft devises.

Therefore it is an object of the present invention to provide a control mechanism capable of both rotating vanes of different stages relative to one another and also independently of one another.

In accordance with the present invention there is provided a control mechanism for moving at least two components of a gas turbine engine, the control mechanism comprises first and second crankshafts and a torsion bar connected to both crankshafts, each crankshaft is connected to a different component, the crankshafts engage one another via abutment means and the torsion bar is pre-twisted so that up to a predetermined rotational extent the two crankshafts rotate together and beyond that extent only the first crankshaft rotates, thereby one of the two components moves more than the other component.

Preferably, a rotating force is applied to the first crankshaft.

Preferably, the torsion bar is connected at its first end to the first crankshaft and at its second end to the second crankshaft.

Preferably, the predetermined rotational extent is set by provision of a stop feature.

Optionally, a third crankshaft is provided and is connected to the torsion bar, the third crankshaft engages the first or second crankshaft via another abutment means and the torsion bar is pre-twisted so that up to a predetermined rotational extent the third and first or second crankshaft rotate together and beyond that extent only the third crankshaft rotates, thereby another component moves more than the other two components.

Preferably, the third crankshaft is connected to a second torsion bar.

In a specific application of the present invention a gas turbine engine comprises multiple stages of vanes and the control mechanism as described in the above paragraphs, the vanes of each stage connected via a unison ring and the first crankshaft is connected to the unison ring of a first stage of vanes and a second crankshaft is connected to the second stage of vanes.

In another specific application of the present invention a gas turbine engine comprises compressor bleed valves and the control mechanism as described in the above paragraphs, the bleed valve(s) connected to the first crankshaft and a second crankshaft is connected to bleed valve(s).

Optionally, the bleed valves are on different stages of the same compressor.

Preferably, the bleed valves are on different compressors.

In yet another specific application of the present invention a gas turbine engine comprising a multi-stage tip clearance control systems for a compressor(s) and/or a turbine and the control mechanism as described in the above paragraphs, the first crankshaft is connected to one of the clearance control systems and a second crankshaft is connected to the other clearance control system.

Optionally, the clearance control systems are on different stages of the same compressor and/or turbine.

Preferably, the clearance control systems are on different compressor and/or turbine.

Preferably, the crankshafts and the torsion bar(s) are substantially coaxial.

Figure 2:
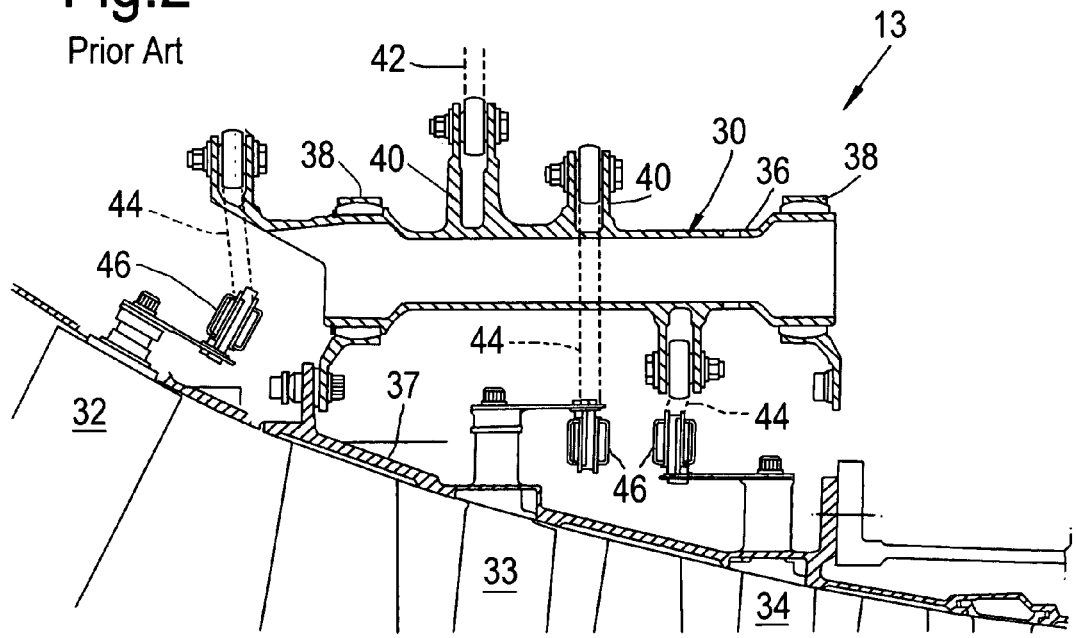
Figure 3:
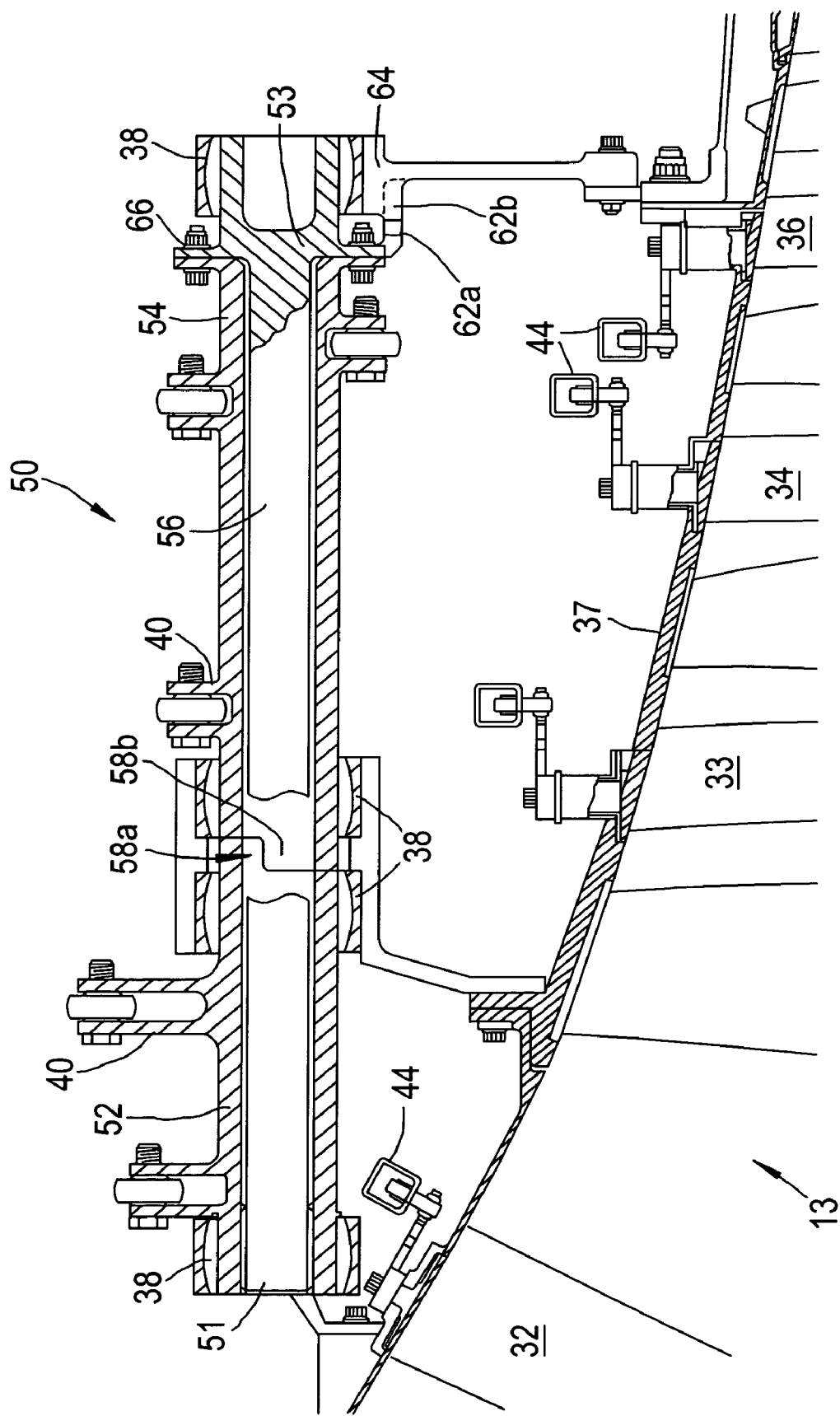
Figure 4:
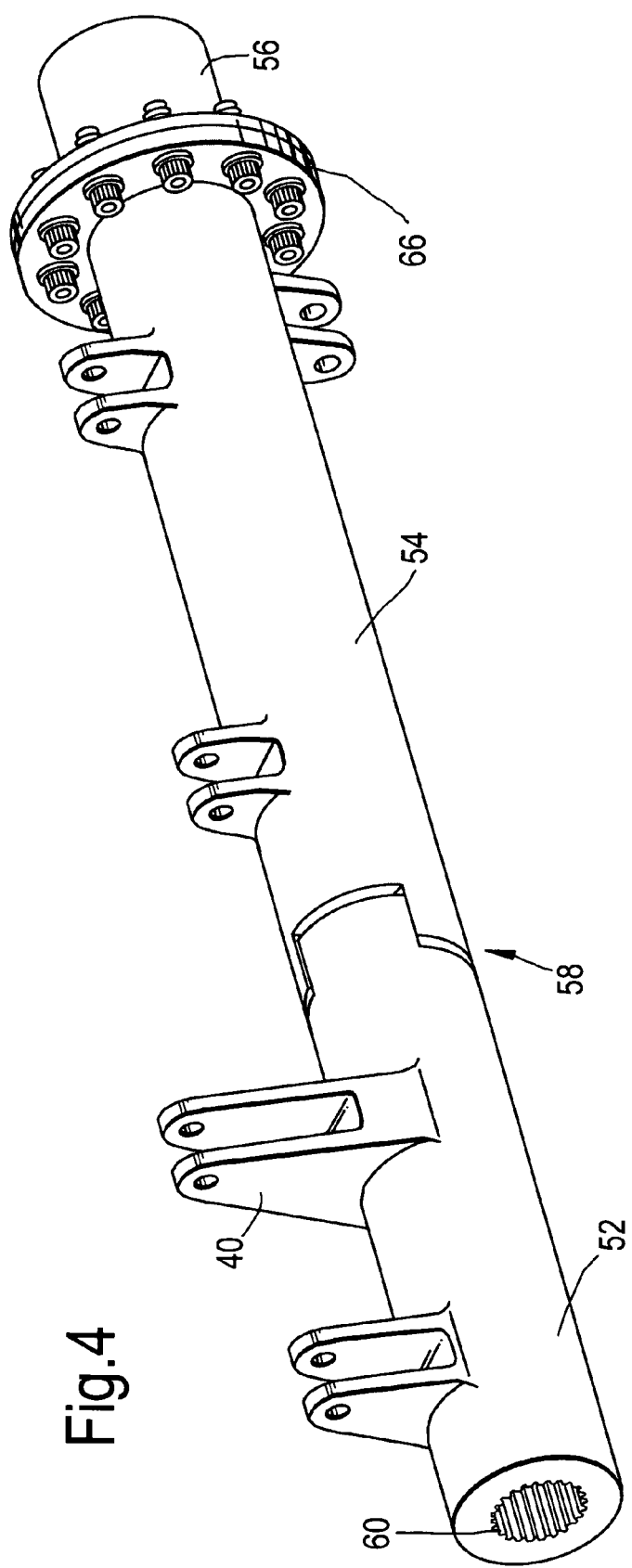
Figure 5:
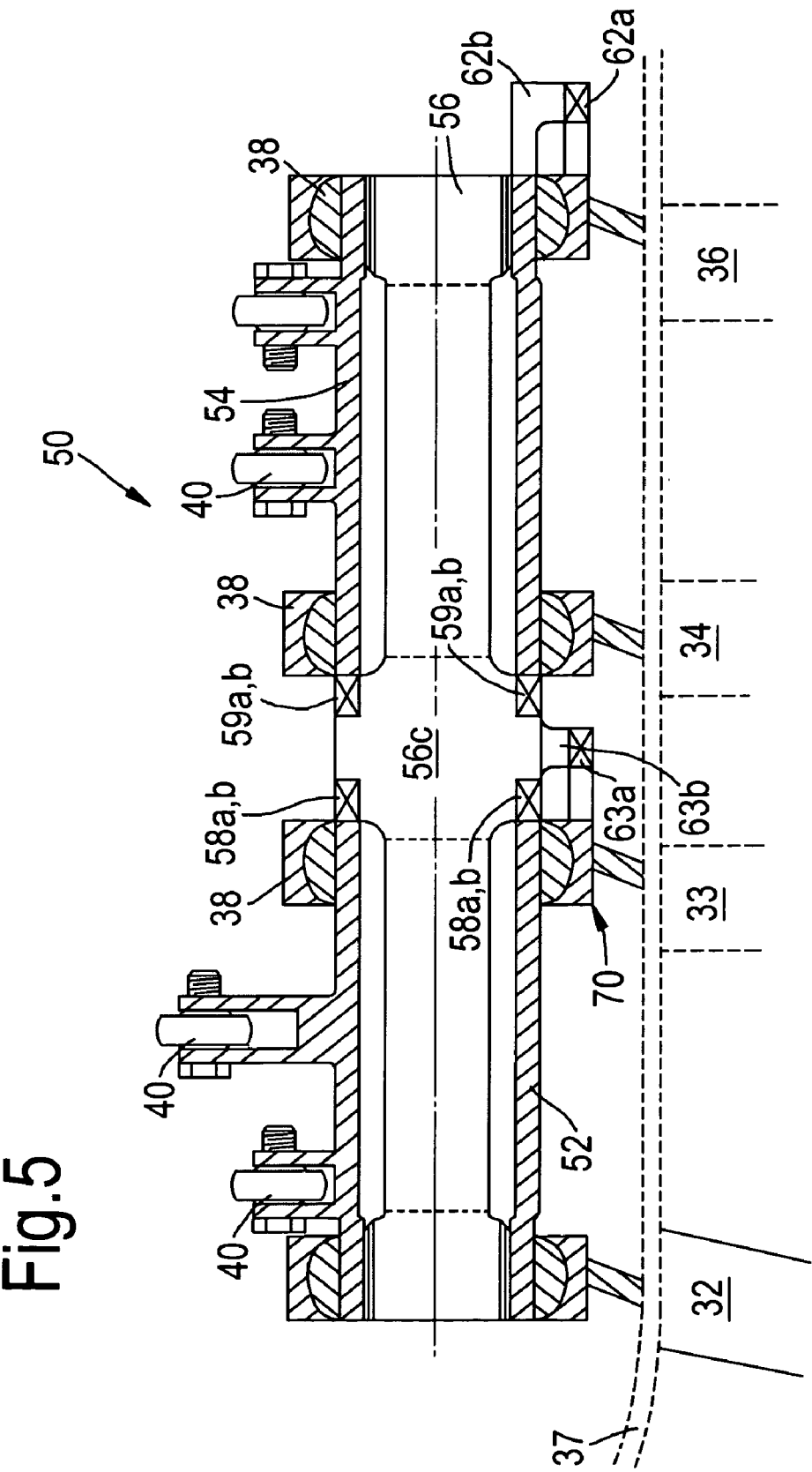

The present invention will be more fully described by way of example with reference to the accompanying drawings in which:

FIG. 1 is a schematic section of part of a conventional gas turbine engine;

FIG. 2 is an enlarged section of an intermediate pressure compressor of the gas turbine engine of FIG. 1 showing a prior art mechanism for varying the angle of stator vanes, FIG. 3 is an enlarged section of a compressor of a gas turbine engine and shows a first embodiment of a control mechanism for varying the angle of stator vanes in accordance with the present invention, FIG. 4 is a perspective view of a crankshaft of the FIG. 3 mechanism and is in accordance with the present invention, FIG. 5 is an enlarged section of a third embodiment of a control mechanism for varying the angle of stator vanes in accordance with the present invention.

With reference to FIG. 1, a gas turbine engine generally indicated at 10 has a principal and rotational axis X-X. The engine 10 comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core exhaust nozzle 19. A nacelle 21 generally surrounds the engine 10 and defines both the intake 11 and a bypass duct 22 which defines a bypass exhaust nozzle 20.

The gas turbine engine 10 works in the conventional manner so that air entering the intake 11 is accelerated by the fan 12 to produce two air flows: a first air flow into the intermediate pressure compressor 13 and a second air flow which passes through the bypass duct 22 to provide propulsive thrust. The intermediate pressure compressor 13 compresses the air flow directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the core nozzle 19 to provide additional propulsive thrust. The high, intermediate and low-pressure turbines 16, 17, 18 respectively drive the high and intermediate pressure compressors 14, 13 and the fan 12 by suitable interconnecting shafts.

Referring now to FIG. 2, it is well known to use a crankshaft 30 to provide control of multiple stages of annular arrays of variable stator vanes 32, 33, 34. These crankshafts 30 typically consist of a tube 36 mounted on a casing 37 via bearings 38 and having a number of devises 40 for mounting an actuator rod 42 and con rods 44 which each drive a unison ring 46. An actuator (not shown) moves the actuator rod 42 thereby rotating the unison rings 44 and rotating the variable stator vanes 32, 33, 34 dependent on compressor and engine performance.

Variable vanes are used where high pressure ratios are required across a single compressor (e.g. intermediate 13 and/or high 14). As a compressor speed is reduced from its optimal design value the variable vanes are progressively closed to maintain an acceptable gas angle onto the downstream rotor blades. This prevents the compressor 13, 14 from surging, an undesirable event, which can result in a loss of engine thrust and damage to turbomachinery.

Existing crankshaft designs provide fixed relationship rotation of each stage of variable stator vanes 32, 33, 34. Whereas this is helpful in controlling the gas flow through the compressor 13, improving its handling capabilities, it is still limited. It is therefore desirable to further control the gas flow thereby further improving the capability of the compressor to prevent surge, whilst also increasing the flow capacity and efficiency of the compressor.

Referring now to the present invention shown in FIGS. 3 and 4, where the same features shown in FIG. 2 have been given the same reference numbers here. The actuator rod and con rods 44 shown in FIG. 2 have been omitted for clarity. A control mechanism 50 comprises two crankshafts 52, 54 linked together with a torsion bar 56 and which rotate by substantially equal amounts to provide linked and relative rotation of each of the four stages of variable vanes 32, 33, 34, 36 for the majority of compressor working conditions. However, additional movement of the first crankshaft 52, via further rotation of actuator clevis 40, causes the variable inlet guide vanes 32 to open further to allow additional flow capacity into the compressor 13 when required.

The two crankshafts 52, 54 and the torsion bar 56 are substantially coaxial. Each crankshaft 52, 54 is mounted to the engine casing 37 via supports and a pair of bearings 38. The crankshafts 52, 54 comprise devises 40 to which con rods 44 attach and extend to unison rings 46, themselves connected via levers to each vane. When assembled in the gas turbine engine 10, there are normally two control mechanism 50, but there may be one on a smaller engine and up to four approximately evenly spaced about the engine casing 37. The unison rings 46 are usually substantially annular, but may be part annular or may be a circumferential segment for each control mechanism 50.

Actuation is provided to the first or front crankshaft 52, from which the rotational position of the inlet guide vane 32 is controlled. The other variable vane stages 33, 34 are driven from the second or rear crankshaft 54. The crankshafts 52 and 54 have their range of relative rotation to one another limited by a set of intermeshing dogs or other abutment means 58. The torsion bar 56 is attached at a first end 51 to the first crankshaft 52 via complimentary spline 60. The torsion bar 56 is attached at a second end 53 to the second crankshaft 54 via a bolted joint 66. The torsion bar 56 is preloaded with torque, applied such that the dogs 58a and 58b on each crankshaft 52, 54 respectively are forced into contact with one another. This preload torque is set to be higher than the maximum actuation load required for rotating the variable vanes 33, 34 attached to the rear crankshaft 54 and such that the vane loads are incapable of unloading the dogs 58 under normal compressor operating conditions.

Corresponding stop features 62a and 62b are provided on the rear crankshaft 54 and a rear mount 64 for the crankshaft 54. The stop features 62a and 62b limit rotation of the rear crankshaft 54 to correspond to the maximum opening of its associated variable vanes 33, 34. Once the rear crankshaft stop 62a engages the stop 62b, further rotation of the front crankshaft 52 is allowed by disengagement of the dogs 58a, b and wind-up of torsion bar 56. Hence additional opening of variable inlet guide vane 32 is provided to allow additional working gas through the compressor 13.

The key advantage to the present invention is that additional compressor flow capacity is gained through additional opening of the variable inlet guide vane 32. Similarly, it is advantageous to be able to close the inlet guide vanes 32 more than the downstream vane stages 33, 34 during certain engine operations.

The mechanism by which this invention achieves this aim is via crankshafts 52, 54, preferably coaxial, linked together with the preloaded torsion bar 56 and anti-rotation dogs 58a, b. A backlash is created in the torsion bar 56 when the first crankshaft 52 is rotated further than the second crankshaft 54. This arrangement enables the two crankshafts to operate as one unit until rotation of the rear crankshaft 54 is prevented, whereupon additional motion of the variable inlet guide vane 32 is allowed by wind-up of the torsion bar 56.

As shown the torsion bar 56 is joined to the front and rear crankshafts 52, 54 with a spline 60 and the bolted joint 66 respectively. Alternatively, the spline 60 and/or bolted joint 66 may be replaced by any one of the group of attachment means comprising splines, welding, torque dogs, hollow dowels, a screw thread and axial stop or location pins.

Similarly, the intermeshing dogs 58a,b are particularly useful to react to preload torque and prevent relative rotation in one direction between the crankshafts when required. Thus to describe further, in a relatively closed vane position the dogs 58 of the first and second crankshafts abut one another with the dog of the second crankshaft being urged against the dog of the first crankshaft by virtue of the pre-twist in the torsion bar. When the vanes are opened the first crankshaft 52 is rotated and the second crankshaft rotates therewith again by virtue of the torsion bar; the dogs remaining in contact. However, once the second crankshaft contacts the stop feature 62, further rotation of the first crankshaft, to open the inlet guide vanes 32, means that the dogs 58 disengage each other. These dogs or other abutting means 58 could be replaced with splines, pins, dowels or some other anti-rotation feature with backlash to give the same function.

It should be apparent to the skilled person that the vane control mechanism 50 may comprise more than two crankshafts, thereby giving the mechanism the ability to rotate by varying amounts the vanes of three or more stages. Essentially, another 'first crankshaft' is added, being mounted on its own bearings. One-way abutting means 58 would be disposed between the additional and first/second crankshaft and additional stop features 62 located for suitable maximum design opening of each stage of vanes. The same or even another torsion bar may be used. As taught by the present invention, the addition of a third crankshaft (or more) allows three or more stages of vanes 32, 33, 34 to be rotated by different amounts, thereby still further improving compressor handling characteristics.

Whereas the control mechanism of the present invention and some alternatives have been described with reference to the application of a gas turbine engine, it should be appreciated that the control mechanism may be employed in other applications where two or more components are driven in during a first phase relative to one another and in a second phase independently. For example, other applications may comprise and other moveable components comprise compressor bleed valves 70, 72 (see FIG. 1) and cooling valves 74, 76 (see FIG. 1) for components such as multi-stage tip clearance control systems for compressors and turbines. The bleed valves 70, 72 may be on different stages of the same compressor or are on different compressors 13, 14. Similarly, the multi-stage tip clearance control systems 74, 76 may be located on different stages of the same compressor/turbine or different compressor/turbines.

As described herein, the vanes 32, 33, 34 are opened in a linked relative rotation, before the inlet guide vanes 32 are then opened further than the vanes 33, 34. In another situation, the mechanism can easily be reconfigured to close the vanes (or move components) in a linked relative rotation, before the inlet guide vanes 32 are closed further than the other vanes 33, 34.

A second embodiment of the present invention uses a similar principal to the first embodiment and reference to FIGS. 3 and 4 is still made. However, in this second embodiment over-closure of the variable stator vanes at engine idle rotational speeds is allowed. Over-closure of vanes reduces compressor capacity at engine idle to facilitate higher shaft rotational speeds at reduced thrust levels and thereby improving fuel efficiency. The control mechanism 50 of this second embodiment is similar to the first embodiment, except that the torsion bar 56 is loaded in the opposite direction so that the additional "wind-up" is achieved at engine idle speeds rather than high power engine operation and high rotational speeds.

In this second embodiment, the dogs 58a,b are reversed so that the abut in the opposite rotation as that in the first embodiment. Torque applied to the torsion bar 56 is in the opposite direction and the gaps between the dogs 58a, b and the stop 62a,b between the rear bracket 64 and the second or rear crankshaft 54 is on the opposite sides to that shown in the first embodiment.

This second embodiment comprises a preload in the torsion bar 56 set at a level greater than the maximum load required to pull the variable stator vanes into a closed position. This allows the compressor 13 capacity to be reduced below that which would normally be possible. While this is not directly advantageous, it enables the shaft speed to be higher for a given thrust. Therefore an engine with the present invention incurs a lower idle fuel burn and a reduction in thrust when the minimum shaft speed sets fuel flow.

In FIG. 5, a third embodiment of the control mechanism 50, which can be used at both high and low power engine conditions, is shown. The same reference numerals are used to denote similar elements of the third embodiment common to FIGS. 3 and 4. The control mechanism 50 comprises additional abutable dogs 59a, b on the second or rear crankshaft 54 and to the torsion bar 56 respectively. Also the control mechanism 50 comprises additional stop features 63a, b on the first crankshaft and torsion bar 56 respectively.

This third embodiment of the control mechanism 50 functions similarly to the first embodiment with the preload or torsion bar 56 acting as the wind-up and pre-load device, reacted at the dogs 58, 59 between the preload bar 56 and first and second crankshafts 52, 54. At the maximum required opening of the variable stator vanes e.g. 36, stop 62a,b comes into engagement and further motion of the actuator (that drives the devises 40) produces rotation of the front crankshaft 52 and a centre-portion 56c of the preload bar 56, disengaging the dogs 59a,b between the preload bar 56 and rear crankshaft 54.

At low power (e.g. descent or idle conditions), when the variable stator vanes 32, 33, 34, 36 reach the limit of their required motion, stop 63a,b between the preload bar 56 and a fixed feature such as support 70 on the engine, comes into engagement and additional motion of the front crankshaft 52 is achieved through wind up of a front part of the torque bar and disengagement of the dogs 58a, b between the preload bar 56 and front crankshaft 52.

We claim:

1. A control mechanism for moving at least two components of a gas turbine engine, the control mechanism comprises first and second crankshafts and a torsion bar connected to both crankshafts, each crankshaft is connected to a different component, the crankshafts engage one another via abutment means and the torsion bar is pre-twisted so that up to a predetermined rotational extent the two crankshafts rotate together and beyond that extent only the first crankshaft rotates, thereby one of the two components moves more than the other component.

2. A control mechanism as claimed in claim 1 wherein a rotating force is applied to the first crankshaft.

3. A control mechanism as claimed in claim 1 wherein the torsion bar is connected at its first end to the first crankshaft and at its second end to the second crankshaft.

4. A control mechanism as claimed in claim 1 wherein the predetermined rotational extent is set by provision of a stop feature.

5. A control mechanism as claimed in claim 1 wherein a third crankshaft is provided and is connected to the torsion bar, the third crankshaft engages the first or second crankshaft via another abutment means and the torsion bar is pre-twisted so that up to a predetermined rotational extent the third and first or second crankshaft rotate together and beyond that extent only the third crankshaft rotates, thereby another component moves more than the other two components.

6. A control mechanism as claimed in claim 5 wherein the third crankshaft is connected to a second torsion bar.

7. A gas turbine engine comprising multiple stages of vanes and the control mechanism as claimed in claim 1, the vanes of each stage connected via a unison ring and the first crankshaft is connected to the unison ring of a first stage of vanes and a second crankshaft is connected to the second stage of vanes.

8. A gas turbine engine comprising compressor bleed valves and the control mechanism as claimed in claim 1, the bleed valve(s) connected to the first crankshaft and a second crankshaft is connected to bleed valve(s).

9. A gas turbine engine as claimed in claim 8 wherein the bleed valves are on different stages of the same compressor.

10. A gas turbine engine as claimed in claim 8 wherein the bleed valves are on different compressors.

11. A gas turbine engine comprising a multi-stage tip clearance control systems for a compressor(s) and/or a turbine and the control mechanism as claimed in claim 1, the first crankshaft is connected to one of the clearance control systems and a second crankshaft is connected to the other clearance control system.

12. A gas turbine engine as claimed in claim 11 wherein the clearance control systems are on different stages of the same compressor and/or turbine.

13. A gas turbine engine as claimed in claim 11 wherein the clearance control systems are on different compressor and/or turbine.

14. A control mechanism as claimed in claim 1 wherein the crankshafts and the torsion bar(s) are substantially coaxial.

* * * * *